United States Patent Office 3,610,079
Patented Oct. 5, 1971

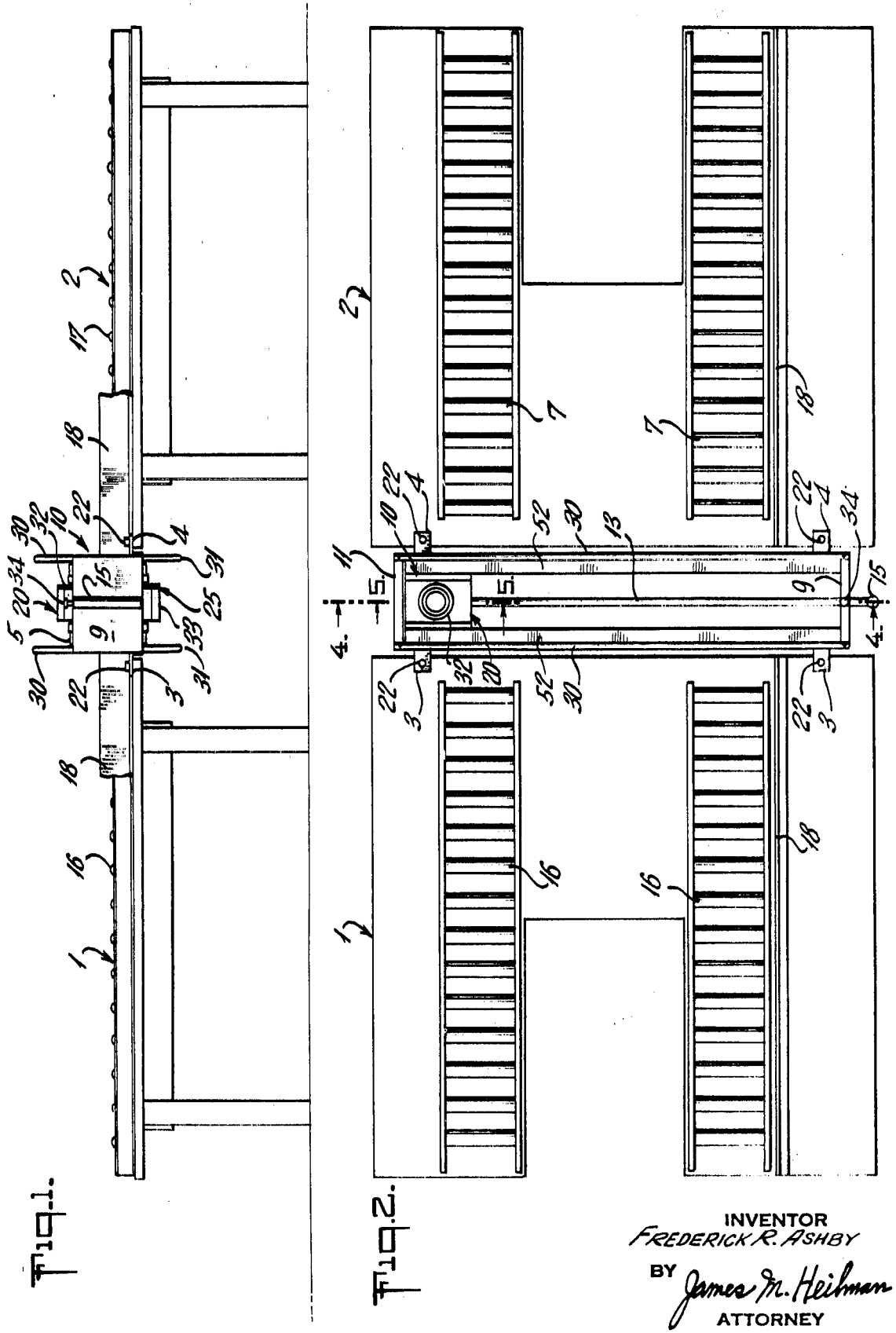

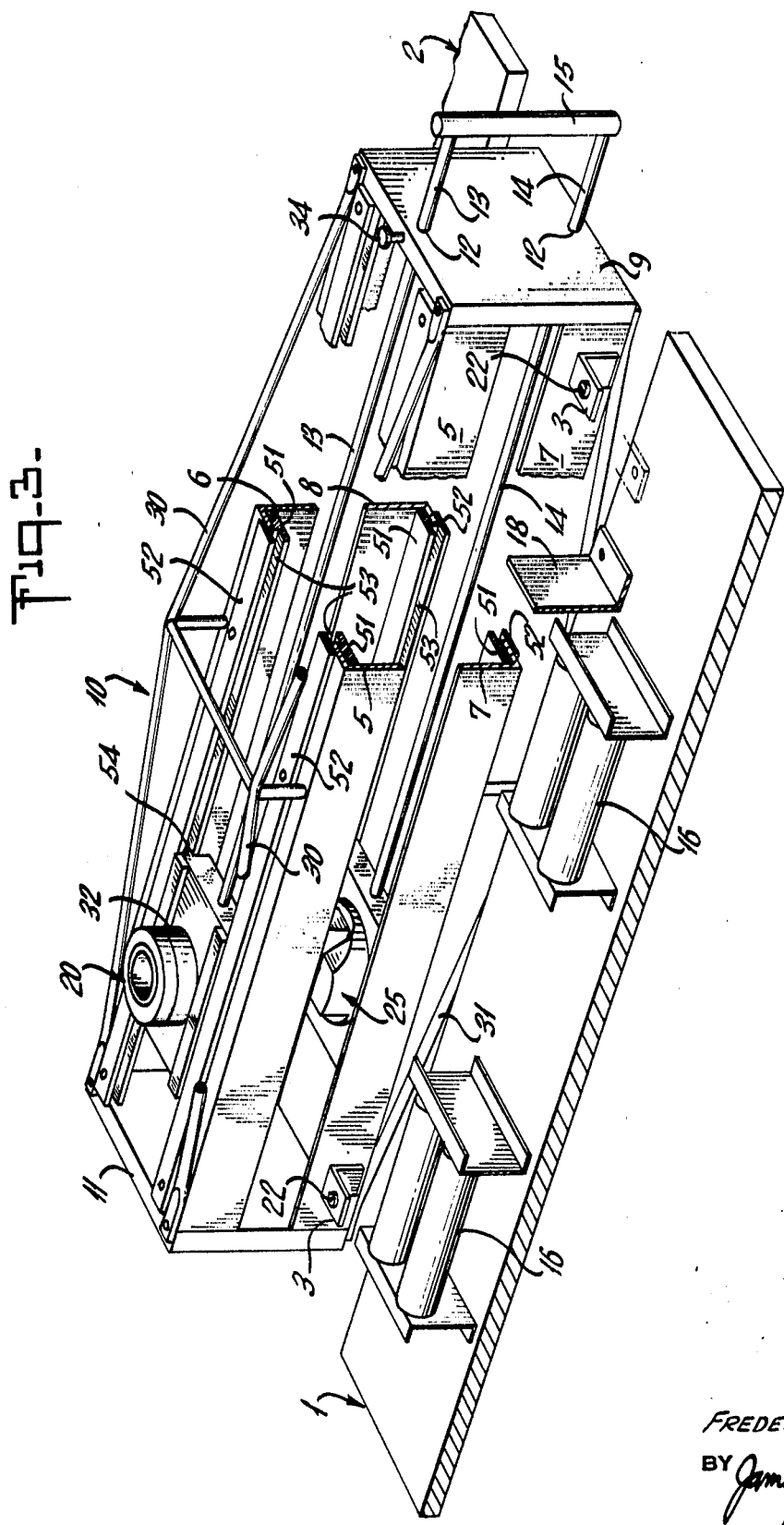

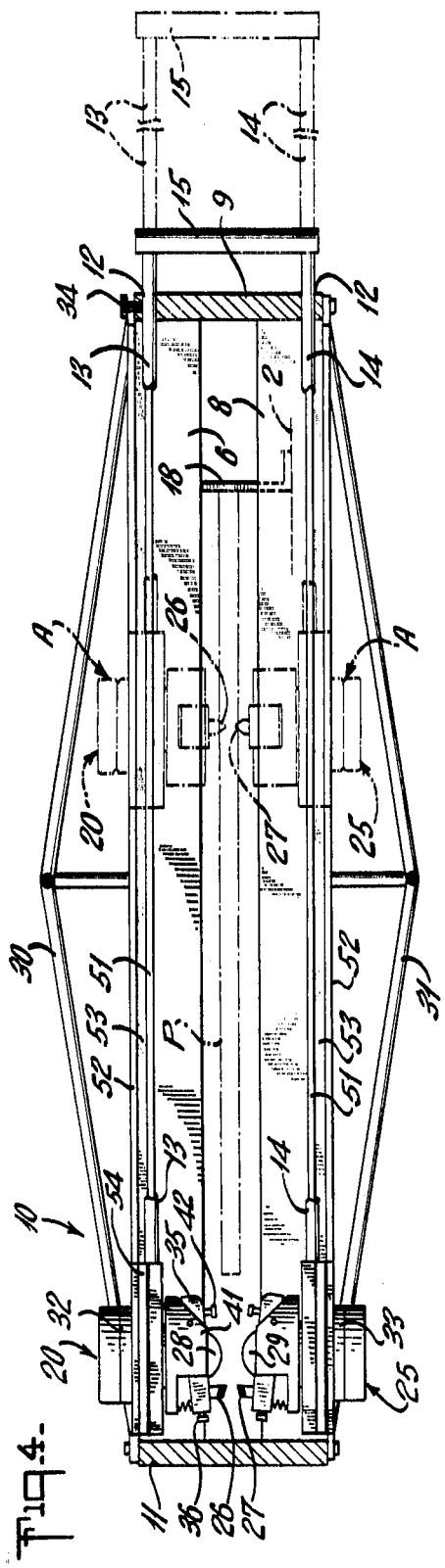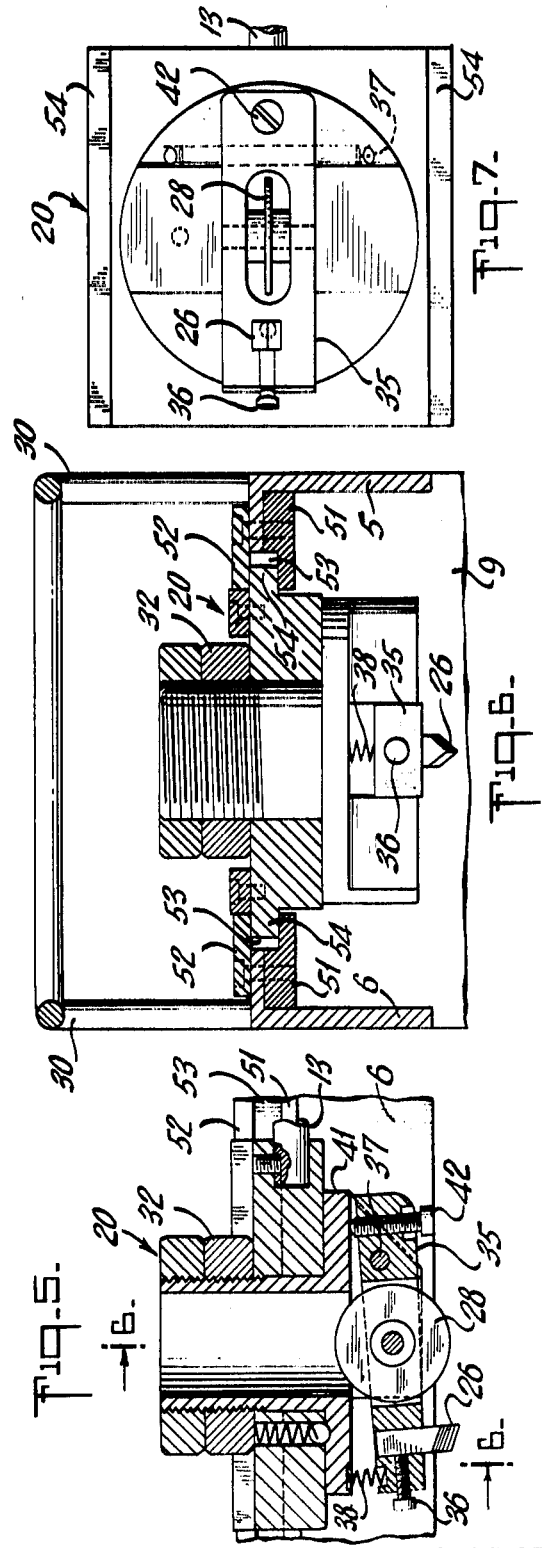

3,610,079
PORTABLE PANEL SCORING AND
CUTTING APPARATUS
Frederick R. Ashby, Carmel, N.Y., assignor to U.S.
Plywood-Champion Papers Inc., New York, N.Y.
Filed Oct. 7, 1969, Ser. No. 864,335
Int. Cl. B26d 3/08
U.S. Cl. 83—11                                       6 Claims

ABSTRACT OF THE DISCLOSURE

The present disclosure covers a unique, portable, cutting or scoring device for panels, particularly for large cement-asbestos type panels or their equivalent such as Glasweld, and Transite panels and similar products. The portable device or apparatus, in essence, comprises an open, elongated box structure comprising four parallel cross elements rigidly affixed to one another at the ends thereof by suitable means. This skeleton, elongated, boxlike structure is designed to support between two upper cross members an upper movable slide having an upper cutting element while the two lower cross elements are designed to support a lower movable slide having a lower scoring or cutting element. The panel to be scored or cut is positioned by suitable means between the upper cutting element and the lower cutting element which are drawn by suitable means across the panel being processed thus scoring the top and bottom surfaces of the panel simultaneously.

---

The present invention covers a unique, portable, cutting or scoring device for panels, particularly for large cement-asbestos type panels or their equivalent such as Glasweld [1], and Transite [2] panels and similar products. The portable device or apparatus, in essence, comprises an open, elongated box structure comprising four parallel cross elements rigidly affixed to one another at the ends thereof by suitable means. This skeleton, elongated boxlike structure is designed to support between two upper cross members an upper movable slide having an upper cutting element while the two lower cross elements are designed to support a lower movable slide having a lower scoring or cutting element. The panel to be scored or cut is positioned by suitable means between the upper cutting element and the lower cutting element which are drawn by suitable means across the panel being processed thus scoring the top and bottom surfaces of the panel simultaneously.

A particular feature of the present apparatus is that the upper and lower cutting elements may be positioned on the cross elements at any point across the panel being processed and the cutting elements rotated 90°. The respective cutting elements may be rigidly affixed on the cross elements in this position and the panel then scored longitudinally by moving the panel past the stationary cutting element. The scored panel may then be fractured along the cut or scored lines by suitable and conventional means.

The invention is also concerned with an apparatus or device which is adapted to score or cut panels particularly brittle panels such as large cement-asbestos type panels. Typical panels of this sort, for example, are designated as Glasweld panel, Transite panels, and the like. In essence, the device is a portable unit which provides a simple and effective way for manufacturers, fabricators, job site installers, lumber yards and similar processors to cut to the desired sizes, pieces from these frangible panels.

In the fabrication and building industry, panels of these characteristics, such as an asbestos-cement panel, cannot be satisfactorily cut to a precise shape or dimension in the field by a common saw or equivalent means wthout damage. In cutting these panels to the correct size, the method has been to score, using a cutting device, and then fracturing by the application of a suitable force. Since these panels cannot be cut to size as desired at the construction site, these panels are cut to a predetermined shape in a central fabricating plant. This procedure is not only expensive and cumbersome, but it also has the disadvantage that a panel cannot be corrected in the field if certain irregularities exist. This greatly increases construction costs. Thus, the device or apparatus of the present invention, which is portable, may readily be installed at the construction site and the panels then readily sized to the correct dimensions as desired.

The apparatus of the present invention may be readily understood by reference to the drawings illustrating embodiments of the same.

FIG. 1 illustrates diagrammatically the method of installing the device between two conventional tables or equivalent supporting structures.

FIG. 2 is a top view of FIG. 1 showing one preferred type of installation.

FIG. 3 is a perspective of the cutting device with parts in section and a portion of table shown exploded.

FIG. 4 is a side section with parts in elevation taken on lines 4—4 of FIG. 2.

FIG. 5 is an enlarged fragmentary section of the cutting device taken on lines 5—5 of FIG. 2.

FIG. 6 is a section on line 6—6 of FIG. 5.

FIG. 7 is a bottom plan of the cutting device.

Referring specifically to FIG. 1, the cutting apparatus 10 of the present invention is shown positioned between tables 1 and 2. While these tables may be positioned any distance apart, it is preferred that they be positioned between 10 and 14 feet apart as, for example, about 12 feet apart. It is generally preferred that the height of these tables be about 25" for effective utilization of the device. A preferred width of these tables is about 5 feet. The device may be affixed to tables 1 and 2 by any suitable means. As illustrated in FIGS. 1, 2 and 3 the device has, as an integral part thereof, a left angle element 3 and a right angle element 4 which elements are rigidly attached to the skeleton base frame. The angle irons 3 and 4 are suitably clamped to the respective table by bolts 22 or equivalent means.

The skeleton base frame comprises an upper left cross angular element 5, an upper right cross angular element 6, a lower left angular element 7, and a lower right element 8. These elements 5, 6, 7 and 8 are secured to end plates 9 and 11 (see FIG. 3). The end plate has bearing holes 12 through which protrude upper bar 13 and lower bar 14 having attached thereto a handle 15 for moving slides containing cutting elements hereinafter described. For convenience in handling the panels it is preferred that conveyors 16 and 17 be positioned on the top of the respective tables so as to readily move the panel to be scored through device 10.

It is to be understood that equivalent structures may be used to support cross members 5, 6, 7 and 8, such as a suitable skeleton structure rather than a solid plate 9. This alternate support may comprise a structure wherein the upper parallel cross elements 5 and 6 are attached to the lower parallel cross elements 7 and 8 by means of vertical tie elements at each end thereof. Similarly cross horizontal tie elements may be used at each end of 5, 6, 7 and 8 to rigidly affix these elements one to the other.

A guide 18 is provided to accurately adjust the panel as desired. Top rod 13 is attached to an upper slide 20. Upper slide 20 has attached on its underside upper cutting or knife element 26 (see FIG. 4) at its midpoint which cutting element protrudes downwardly. This slide 20 when activated by handle 15 and rod 13 moves along upper

---

[1] Glasweld is trademark of U.S. Plywood-Champion Papers Inc.
[2] Transite is trademark of Johns-Manville Corp.

left cross angular element 5 and along upper right cross angular element 6 so as to score the upper surface of the panel being processed. The method or technique of affixing slide 20 to supporting cross elements 5 and 6 may be by any conventional method, such as, secured to elements 5, 6, 7 and 8 are plates 51 and 52 which form a groove 53 into which tabs 54 or slides 20 and 25 slides therein.

Referring specifically to FIG. 4, an end view of the apparatus is illustrated. The panel P being processed passes between upper left cross angular element 5 and lower cross angular element 7. The panel P also passes between upper right cross angular element 6 and lower right cross angular element 8 (see FIG. 3). Upper rod 13 is attached to handle 15 and slide 20 and moves upper slide 20 along cross elements 5 and 6. Lower rod 14 is attached to handle 15 and to lower slide 25 and moves this slide along cross elements 7 and 8. Upper knife or cutter 26 is shown supported by upper slide 20 while a lower knife or cutter 27 is shown supported by lower slide 25. An upper guide wheel 28 which moves along the panel upper surface is supported by slide 20 while a lower guide wheel 29 which moves along the panel undersurface is supported by lower slide 25.

The upper and lower cross angle elements 5, 6, 7 and 8 constituting the main angle or base frame and further strengthened by means of curved support rods 30 and 31, respectively. Knife rotating knobs 32 and 33 are provided so as to rotate the cutting elements 90°. Thus, in operation, if it is desired to score the panel lengthwise at a predetermined distance from the edge such as is shown in position A, the respective knives are drawn into this position by moving handle 15 and then rotating the knives 90°. The knobs are then tightened so as to put the knives in a permanent position. The panel is forced therethrough thus securing a longitudinal groove or cut. A lock screw 34 is also provided through end plate 9 so as to firmly affix the slide in the position desired when scoring longitudinally.

Referring specifically to FIGS. 5, 6 and 7, details of a preferred cutting head assembly which is attached to the slide 20 are illustrated. Cutting knife 26 is carried by arm 35 and is firmly held secure at the right depth by means of screw 36. Arm 35 is pivotally held and supported by rotatable mounting 41 by means of pivot 37. Rotatable mounting 41 is rotated by knob 32 which extends through slide 20. A spring 38 maintains the desired tension of the knife against the panel. The depth of the score or cut in the panel is the amount which the end of the knife extends beyond wheel 28 which moves along the panel surface. A lower portion of 41 provides a proper fit between the rotatable mounting assembly 41 and the slide 20. A cutter arm adjustment screw 42 is provided so as to adjust the depth of the cut.

Thus, in operation a panel to be scored crosswise is passed along conveyors 16 and 17 between the respective cross elements 5, 6, 7, and 8 to the desired position. Handle 15 is then pulled which, by means of upper rod 13 and lower rod 14, move upper slide or cutting head 20 and lower slide or cutting head 25 across the panel. The respective knives 26 and 27 thus crosswise score the panel to the predetermined depth.

If the panel is to be scored lengthwise, the cutters are placed at the desired position crosswise on the panel. The rotatable assembly and the knives are rotated 90° by means of rotating knobs 32 and 33. The crosswise position of the knives is firmly fixed by seating or tightening knob 34. The panel is then pushed lengthwise past these knives securing the desired scoring action.

In operation two tables are placed approximately 7½" apart to receive cutting apparatus which is positioned between the space on mounting lugs. The device height is adjusted by shimming at mounting lugs 3 and 4 so that the bottom cutting knife blade slightly penetrates and scores the back side of the panel. The top scoring knife is adjusted and should also be set to slightly penetrate the face surface of the panel to produce an even scored cut.

The object of the invention is to provide a simple but effective way for manufacturers, fabricators, job site installers, lumber yards and retail yards to supply cut-to-size pieces from large cement asbestos-type panels such as Glasweld, Transite and similar products. The present apparatus can accommodate cutting, marking, scoring and shearing. It is universal in its operation since it will operate manually or automatically in the vertical and horizontal position and can be readily transported to job sites for on site installations.

The embodiments of the invention in which an exclusive property or privilege is claimed are defined as follows:

1. A portable cutting and scoring apparatus which comprises, (1) an elongated, open, boxlike base structure consisting of, (2) two upper supporting parallel cross bars and, (3) two lower supporting parallel cross bars, said cross bars being rigidly affixed to one another, (4) an upper slide adapted to slide along said two upper parallel cross bar, (5) a lower slide adapted to slide along said two lower parallel cross bars, (6) a first cutting and scoring knife projecting downwardly from said upper slide, (7) a second cutting and scoring knife projecting upwardly from second cutting and scoring knife projecting upwardly from said lower slide, said knives being affixed to said slides by rotatable mounting means which permit said knives to be rotated 90°, said upper slide and said lower slide being of sufficient distance apart so as to permit a panel to be moved therebetween and, (8) means for moving said slides across said panel in a manner that said knives attached to said slides will score and cut said panel.

2. Apparatus as defined by claim 1 wherein said knives are attached to said rotatable mounting means by (9) a pivoted arm maintained in tension by (10) a spring element.

3. Apparatus as defined by claim 1 wherein rotating knobs extend through said slides and are adapted to rotate said rotatable mounting means.

4. Apparatus as defined by claim 1 wherein rollers are affixed to said rotatable mounting means and are adapted to roll along the top and undersurface of the panel being scored.

5. Apparatus as defined by claim 4 wherein knife adjusting means are provided on said rotatable mounting means whereby the distances that the knives extend beyond said rollers may be adjusted.

6. A portable cutting and scoring apparatus which comprises, (1) an elongated, open, boxlike base structure consisting of, (2) two upper supporting parallel cross bars and, (3) two lower supporting parallel cross bars, said cross bars being rigidly affixed to one another by, (4) a first set of two vertical elements and two horizontal elements affixed to the ends of said cross bars and, (5) by a second set of two vertical and two horizontal elements affixed to the other ends of said cross bars, (6) a slide adapted to slide along said two parallel cross bars, (7) a cutting and scoring knife projecting from said slide, said cutting knife being affixed to said slide by a rotatable mounting means which permits said knife to be rotated 90°, and (8) means for moving said slide across said panel in a manner that said knife attached to said slide will score and cut said panel.

References Cited

UNITED STATES PATENTS

| | | | |
|---|---|---|---|
| 2,225,630 | 12/1940 | Gilbert | 83—6 UX |
| 2,706,002 | 4/1955 | Whittamore | 83—12 |
| 3,388,414 | 6/1968 | Hilty et al. | 83—12 X |
| 3,426,629 | 2/1969 | Herzig et al. | 83—7 |

JAMES M. MEISTER, Primary Examiner

U.S. Cl. X.R.

83—433, 574, 614, 651